(12) United States Patent
Zhang et al.

(10) Patent No.: US 11,929,483 B2
(45) Date of Patent: Mar. 12, 2024

(54) POSITIVE ELECTRODE AND LITHIUM-ION BATTERY

(71) Applicant: Ningde Amperex Technology Limited, Fujian (CN)

(72) Inventors: Xiaozhen Zhang, Fujian (CN); Fan Yang, Fujian (CN); Changming Qu, Fujian (CN); Yisong Su, Fujian (CN); Chaowang Lin, Fujian (CN); Huawei Zhong, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 246 days.

(21) Appl. No.: 16/170,020

(22) Filed: Oct. 24, 2018

(65) Prior Publication Data
US 2019/0267612 A1    Aug. 29, 2019

(30) Foreign Application Priority Data

Feb. 26, 2018 (CN) .......................... 201810162493.7

(51) Int. Cl.
*C01B 25/26* (2006.01)
*C01G 45/12* (2006.01)
(Continued)

(52) U.S. Cl.
CPC ............ *H01M 4/131* (2013.01); *C01B 25/26* (2013.01); *C01G 45/1257* (2013.01);
(Continued)

(58) Field of Classification Search
None
See application file for complete search history.

(56) References Cited

U.S. PATENT DOCUMENTS

| | | | |
|---|---|---|---|
| 2006/0019151 A1* | 1/2006 | Imachi | H01M 4/5825 |
| | | | 429/128 |
| 2011/0123866 A1* | 5/2011 | Pan | H01M 4/583 |
| | | | 427/458 |

(Continued)

FOREIGN PATENT DOCUMENTS

| | | |
|---|---|---|
| CN | 1905265 A | 1/2007 |
| CN | 100338800 C | 9/2007 |

(Continued)

OTHER PUBLICATIONS

English translation of CN 105098193 (Year: 2015).*
(Continued)

*Primary Examiner* — Yoshitoshi Takeuchi
(74) *Attorney, Agent, or Firm* — Maier & Maier, PLLC (57) ABSTRACT

The present application provides a positive electrode and a lithium-ion battery. The positive electrode comprises a current collector; a first active material layer comprising a first active material; and a second active material layer; wherein the first active material layer is arranged between the current collector and the second active material layer, the first active material layer comprises a first active material, and the first active material is at least one selected from a group consisting of a modified lithium transition metal oxide positive electrode material and a modified lithium iron phosphate. The positive electrode of the present application helps to improve the thermal stability of the lithium-ion battery, and the improvement of the thermal stability may reduce the proportion of the thermal runaway when the lithium-ion battery is internally short-circuited so that the safety performance of the lithium-ion battery is improved.

8 Claims, 2 Drawing Sheets

(51) Int. Cl.
  *C01G 53/00* (2006.01)
  *H01M 4/131* (2010.01)
  *H01M 4/133* (2010.01)
  *H01M 4/505* (2010.01)
  *H01M 4/525* (2010.01)
  *H01M 10/0525* (2010.01)
  *H01M 4/02* (2006.01)

(52) U.S. Cl.
  CPC ............ *C01G 53/50* (2013.01); *H01M 4/133* (2013.01); *H01M 4/505* (2013.01); *H01M 4/525* (2013.01); *H01M 10/0525* (2013.01); *C01P 2002/52* (2013.01); *C01P 2002/88* (2013.01); *H01M 2004/028* (2013.01)

(56) References Cited

U.S. PATENT DOCUMENTS

| | | | | |
|---|---|---|---|---|
| 2013/0216911 A1* | 8/2013 | Hosoya | ................ | H01M 4/362 |
| | | | | 429/223 |
| 2013/0216914 A1* | 8/2013 | Zaghib | ................ | H01M 4/366 |
| | | | | 429/231.1 |
| 2016/0013480 A1* | 1/2016 | Sikha | ................ | H01M 4/043 |
| | | | | 427/126.6 |
| 2016/0020467 A1* | 1/2016 | Sugita | ................ | H01M 4/366 |
| | | | | 429/209 |
| 2017/0092943 A1* | 3/2017 | Li | ................ | H01M 10/0525 |
| 2017/0133672 A1* | 5/2017 | Song | ................ | H01M 4/628 |

FOREIGN PATENT DOCUMENTS

| | | | | |
|---|---|---|---|---|
| CN | 100423326 | C | | 10/2008 |
| CN | 201153140 | Y | | 11/2008 |
| CN | 101378897 | A | | 3/2009 |
| CN | 101635344 | A | | 1/2010 |
| CN | 101969114 | A | | 2/2011 |
| CN | 102130322 | A | | 7/2011 |
| CN | 102332558 | A | | 1/2012 |
| CN | 102013469 | B | | 9/2013 |
| CN | 103515577 | A | | 1/2014 |
| CN | 105098193 | * | 11/2015 | ........ H01M 10/0525 |
| CN | 105098193 | A | | 11/2015 |
| CN | 102324493 | B | | 3/2016 |

OTHER PUBLICATIONS

StudyLib presentation (Year: 2016).*
Office Action dated Mar. 4, 2020 in connection with corresponding Chinese Application No. 201810162493.7 (10 pp., including machine-generated English translation).
Office Action dated Jul. 21, 2020 in connection with corresponding Chinese Application No. 201810162493.7 (6 pp., including machine-generated English translation).

* cited by examiner

POSITIVE ELECTRODE AND LITHIUM-ION BATTERY

PRIORITY CLAIM AND CROSS-REFERENCE

This application claims priority to and benefits of Chinese Patent Application Serial No. 201810162493.7 filed with China National Intellectual Property Administration on Feb. 26, 2018, entitled "POSITIVE ELECTRODE AND LITHIUM-ION BATTERY", and the entire content of which is incorporated herein by reference.

FIELD OF THE APPLICATION

The present application relates to a battery, in particular, to a positive electrode and a lithium-ion battery.

BACKGROUND OF THE APPLICATION

Lithium-ion batteries have entered into our daily live with advances in technology and environmental protection. With the large-scale popularization of lithium-ion batteries, the safety problems caused by external force puncture of lithium-ion batteries occasionally appear on the user side, and their safety performance has been paid more and more attention by people. In particular, the continuous appearance of some mobile phone explosions has made users, back-end and lithium-ion battery manufacturers put forward new requirements for the safety performance of lithium-ion batteries.

At present, the method for improving the safety of lithium-ion batteries is at the expense of the energy density of lithium-ion batteries. Therefore, it is urgent to provide technical means capable of significantly to improve the safety performance of lithium-ion batteries under the conditions of high energy density.

SUMMARY OF THE APPLICATION

To enhance the safety of the lithium-ion batteries, the application provides a positive electrode and a lithium-ion battery comprising the positive electrode, which help to improve the thermal stability of the lithium-ion battery, and the improvement of the thermal stability may reduce the proportion of the thermal runaway when the lithium-ion battery is internally short-circuited so that the safety performance of the lithium-ion battery is improved.

Some examples of the present application provide a positive electrode. The positive electrode comprises a current collector; a first active material layer comprising a first active material; and a second active material layer; wherein the first active material layer is arranged between the current collector and the second active material layer, and the first active material comprises at least one selected from a group consisting of compounds represented by Chemical Formula 1 and Chemical Formula 2:

Chemical Formula 1 wherein M1 represents at least one selected from a group consisting of manganese and aluminum, N represents at least one selected from a group consisting of magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, c and d are respectively in the following ranges: $0.8 \leq x \leq 1.2$, $0.3 \leq a \leq 0.98$, $0.02 \leq b \leq 0.4$, $0 < c \leq 0.4$, $-0.1 \leq d \leq 0.2$ and $a+b+c \leq 1$;

Chemical Formula 2 wherein M2 represents at least one selected from a group consisting of aluminum (Al), magnesium (Mg), titanium (Ti), zirconium (Zr), calcium (Ca), manganese (Mn), germanium (Ge), tin (Sn), selenium (Se), tellurium (Te) and bismuth (Bi), and the values of y, e and f are respectively in the following ranges: $0.9 \leq y \leq 1.1$, $0 < e \leq 0.01$, $-0.1 \leq f \leq 0.1$.

In some examples of this application, wherein the first active material layer is arranged on at least one surface of the current collector.

In some examples of this application, wherein at least a portion of the surface of the compound represented by the chemical formula 1 comprises a metal oxide.

In some examples of this application, wherein the metal oxide comprises one or more selected from a group consisting of $Al_2O_3$, $MgO$, $TiO_2$, $ZrO_2$, $CaO$, and $Fe_2O_3$.

In some examples of this application, wherein the content of any one of the N elements is in the range of 10 to 2000 ppm based on the total weight of the compound represented by the chemical formula 1.

In some examples of this application, wherein the compound represented by the chemical formula 2 is a carbon-coated compound.

In some examples of this application, wherein the content of any one of M2 elements is in the range of 10 to 3000 ppm based on the total weight of the compound represented by the chemical formula 2.

In some examples of this application, wherein the second active material layer comprises a second active material.

In some examples of this application, wherein the second active material is selected from at least one of lithium cobalt oxide, transition metal element doped lithium cobalt oxide, metal oxide coated lithium cobalt oxide, and combinations thereof.

Some examples of the present application also provide a lithium-ion battery comprising the above positive electrode.

In some examples of the present application, at least one of the compound represented by the chemical formula 1 and formula 2 is used in the first active material in the first active material layer of the positive electrode to improve the thermal stability of the lithium-ion battery, and the improvement of the thermal stability may reduce the proportion of the thermal runaway when the lithium-ion battery is internally short-circuited so that the safety performance of the lithium-ion battery is improved.

DETAILED DESCRIPTION OF THE PREFERRED EXAMPLES

The exemplary examples are described in sufficient detail below, but these exemplary examples may be implemented in various ways and should not be construed as being limited to the examples set forth herein. Rather, these examples are provided so that the present application will be thorough and complete and the scope of the present application is fully conveyed to those skilled in the art.

Figure 1:
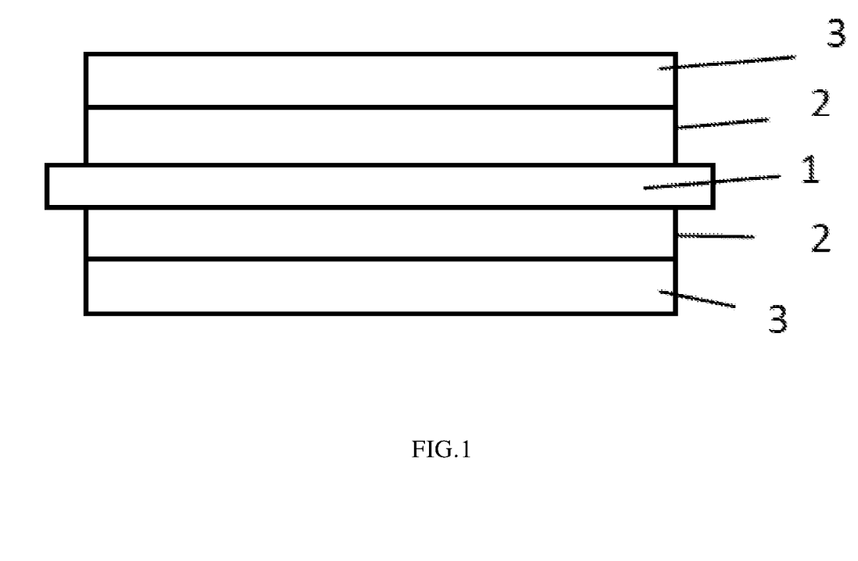
FIG. 1 shows a view of the structure of the positive electrode according to some examples of the present application.

As shown in FIG. 1, a view of positive electrode is illustrated. The positive electrode comprises a positive current collector 1, a first active material layer 2 on the upper and lower surface of the positive current collector 1, and a second active material layer 3 on the first active material layer 2. Both the first active material layer 2 and the second active material layer 3 may comprise a positive active material, a conductive agent and a binder. The positive active material of the first active material layer 2 may comprise at least one selected from a group consisting of compounds represented by Chemical Formula 1 and formula 2:

Chemical Formula 1 wherein M1 represents at least one selected from a group consisting of manganese (Mn) and aluminum (Al), N represents at least one selected from a group consisting of magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, c and d are respectively in the following ranges: $0.8 \leq x \leq 1.2$, $0.3 \leq a \leq 0.98$, $0.02 \leq b \leq 0.4$, $0 < c \leq 0.4$, $-0.1 \leq d \leq 0.2$ and $a+b+c \leq 1$;

Chemical Formula 2 wherein M2 represents at least one selected from a group consisting of aluminum (Al), magnesium (Mg), titanium (Ti), zirconium (Zr), calcium (Ca), manganese (Mn), germanium (Ge), tin (Sn), selenium (Se), tellurium (Te) and bismuth (Bi), and the values of y, e and f are respectively in the following ranges: $0.9 \leq y \leq 1.1$, $0 < e \leq 0.01$, $-0.1 \leq f \leq 0.1$.

The positive active material of the second active material 3 may comprise at least one of lithium cobalt oxide, transition metal element doped lithium cobalt oxide, metal oxide coated lithium cobalt oxide, and combinations thereof. The conductive agent may comprise carbon black, carbon nanotubes, graphene, and the like. The binder may comprise one or more selected form a group consisting of styrene butadiene rubber, polyvinylidene fluoride (PVDF), and derivatives thereof. However, any other suitable material may be employed.

At present, mechanical abuse may lead to short-circuit of lithium-ion batteries, which may cause thermal runaway of lithium-ion batteries, which in turn leads to safety problems in lithium-ion batteries. In order to improve the mechanical abuse performance of the lithium-ion battery, various technical means can be employed. Although these technical means have improved the safety performance of the lithium-ion battery, they have a great influence on the volumetric energy density of the lithium-ion battery.

The technical solution of the present application improves the safety of the lithium-ion battery from the other hand, and improves the thermal stability of the lithium-ion battery, thereby reducing the proportion of thermal runaway even when the lithium-ion battery is short-circuited and further improving the safety performance of the lithium-ion battery.

The first active material in the first active material layer 2 of the positive electrode of the present application employs at least one of the compound represented by the chemical formula 1 and 2, such as lithium nickel cobalt manganese oxide doped with elements, lithium nickel cobalt manganese oxide coated with metal oxide, lithium nickel-cobalt aluminate oxide doped with elements, lithium iron phosphate doped with elements, to improve the thermal stability of the positive electrode. The differential scanning calorimetry (DSC) of the two-layered structure of the first active material layer and the second active material layer (for example, lithium cobalt oxide) has an exothermic peak value beyond 280° C., thereby improving the thermal stability of the lithium-ion battery, and the improvement of the thermal stability may reduce the proportion of the thermal runaway when the lithium-ion battery is internally short-circuited so that the safety performance of the lithium-ion battery is improved.

The positive active material (the first active material) in the first active material layer may be a compound represented by the chemical formula 1, wherein $Li_xNi_aCo_bM1_cN_{1-a-b-c}O_{2-d}$ is the chemical formula 1, and wherein M1 represents at least one selected from a group consisting of manganese (Mn) and aluminum (Al), N represents at least one selected from a group consisting of magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, c and d are respectively in the following ranges: $0.8 \leq x \leq 1.2$, $0.3 \leq a \leq 0.98$, $0.02 \leq b \leq 0.4$, $0 < c \leq 0.4$, $-0.1 \leq d \leq 0.2$ and $a+b+c \leq 1$; In addition, at least a portion of the surface of lithium nickel cobalt manganese oxide may include a metal oxide. The metal oxide is selected from one or more of $Al_2O_3$, MgO, $TiO_2$, ZrO2, CaO, and $Fe_2O_3$. In the present application, the content of any one of N elements is in the range of 10 to 2000 ppm based on the total weight of the compound represented by the chemical formula 1. In this content range, as the content of the element increases, the thermal stability of the lithium-ion battery may be improved, but when the content is too large, the performance of the material is affected, such as a decrease in the capacity.

The positive active material in the first active material layer may also be a compound represented by the chemical formula 2, wherein $Li_yM2_eFe_{1-e}PO_{4-f}$ is the chemical formula 2, and wherein M2 represents at least one selected from a group consisting of aluminum (Al), magnesium (Mg), titanium (Ti), zirconium (Zr), calcium (Ca), manganese (Mn), germanium (Ge), tin (Sn), selenium (Se), tellurium (Te) and bismuth (Bi), and the values of y, e and f are respectively in the following ranges: $0.9 \leq y \leq 1.1$, $0 < e \leq 0.01$, $-0.1 \leq f \leq 0.1$. In some examples, the compound represented by the chemical formula 2 is a carbon-coated lithium iron phosphate. In some examples, the content of any one of the M2 elements is in the range of 10 to 3000 ppm based on the compound represented by the chemical formula 2. In this element content range, as the content of the element increases, the thermal stability of the lithium-ion battery may be improved, but when the content is too high, the performance of the material is affected, such as a decrease in the capacity.

Examples of the present application also provide a lithium-ion battery comprising the above positive electrode. The lithium-ion battery comprises a positive electrode, a negative electrode, a separator, an electrolyte, and the like, wherein the positive electrode is the positive electrode described in the present application.

Negative Electrode:

The negative electrode comprises a negative electrode material comprising the negative electrode material capable of intercalation/deintercalation of lithium (hereinafter, sometimes referred to as "positive electrode material capable of intercalation/deintercalation of lithium"). Examples of the negative electrode material capable of intercalation/deintercalation lithium may comprise carbon materials, metal compounds, oxides, sulfides, nitrides of lithium such as $LiN_3$, lithium metal, metals which form alloys together with lithium and polymer materials.

Examples of carbon materials may comprise low graphitized carbon, easily graphitizable carbon, artificial graphite, natural graphite, mesocarbon microbeads, soft carbon, hard carbon, pyrolytic carbon, coke, glassy carbon, organic polymer compound sintered body, carbon fiber and activated carbon. Among them, coke may comprise pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may comprise polyacetylene and polypyrrole.

Further, in the negative electrode material capable of intercalation/deintercalation lithium, a material whose charging and discharging voltages are close to the charging and discharging voltage of lithium metal is selected. This is because the lower the charging and discharging voltage of the negative electrode material, the easier for the battery to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalation/deintercalation of lithium may comprise elemental lithium metal, metal elements and semimetal elements capable of forming an alloy together with lithium, and alloys and compounds comprising such metal elements and semimetal. In particular, they are used together with carbon materials because in this case, good cycle characteristics as well as high energy density may be obtained. In addition to alloys comprising two or more metal elements, the alloys used herein also comprise alloys comprising one or more metal elements and one or more semi-metal elements. The alloy may be in the form of a solid solution, a eutectic crystal (eutectic mixture), an intermetallic compound, and a mixture thereof.

Examples of the metal element and the semi-metal element may comprise tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may comprise a material having a chemical formula $Ma_sMb_tLi_u$ and a material having a chemical formula $Ma_pMc_qMd_r$. In these chemical formulae, Ma is at least one selected from a group consisting of metal element and semi-metal element capable of forming an alloy together with lithium; Mb is at least one selected from a group consisting of metal element and semi-metal element other than lithium and Ma; Mc is at least one selected from the non-metallic elements; Md is at least one selected from a group consisting of metal element and semi-metal element other than Ma; and s, t, u, p, q and r meets: $s>0$, $t\geq0$, $u\geq0$, $p>0$, $q>0$ and $r\geq0$.

Further, an inorganic compound not comprising lithium such as $MnO_2$, $V_2O_5$, $V_6O_{13}$, NiS, and MoS may be used in the negative electrode.

Electrolyte:

The electrolyte comprises a lithium salt and a non-aqueous solvent.

The lithium salt comprises one or more selected from a group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, LiBOB, LiBr and lithium difluoroborate. For example, the lithium salt selects $LiPF_6$ because it may provide high ionic conductivity and improved cycle characteristics.

The non-aqueous solvent may be a carbonate compound, an ester-based compound, an ether-based compound, a ketone-based compound, an alcohol-based compound, an aprotic solvent, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylene propyl carbonate (EPC), and methyl ethyl carbonate (MEC) and combinations thereof. Examples of the cyclic carbonate compound are ethylene carbonate (EC), propylene carbonate (PC), butylene carbonate (BC), vinyl ethylene carbonate (VEC), and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

Examples of the ester-based compound are methyl acetate, ethyl acetate, n-propyl acetate, t-butyl acetate, methyl propionate, ethyl propionate, γ-butyrolactone, azlactone, valerolactone, mevalonolactone, caprolactone, methyl formate and combinations thereof.

Examples of the ether-based compound are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

An example of the ketone-based compound is cyclohexanone.

Examples of alcohol-based compounds are ethanol and isopropanol.

Examples of aprotic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, nitromethane, trimethyl phosphate, triethyl phosphate, trioctyl phosphate and phosphate, and combinations thereof.

Separator:

The separator comprises at least one selected from a group consisting of polyethylene, polypropylene, polyethylene terephthalate, polyimide, and aramid. For example, the polyethylene comprises at least one component selected from a group consisting of high density polyethylene, low density polyethylene, and ultra high molecular weight polyethylene. In particular, polyethylene and polypropylene, which have a good effect on preventing short circuits, may improve the stability of the battery by the shutdown effect.

The separator surface of separator may further comprise a porous layer arranged on at least one surface of the separator, the porous layer comprising inorganic particles and a binder. The inorganic particle is one or more selected from a group consisting of alumina ($Al_2O_3$), silica ($SiO_2$), magnesia (MgO), titania ($TiO_2$), ceria ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide and barium sulfate. The binder is one or more selected from a group consisting of polyvinylidene fluoride, a copolymer of vinylidene fluoride-hexafluoropropylene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene and polyhexafluoropropylene.

The porous layer on the surface of the separator may improve the heat resistance, oxidation resistance and electrolyte wetting property of the separator, and enhance the adhesion between the separator and the electrode.

The positive electrode, the separator, the negative electrode are sequentially wound or folded into a cell, and then sealed (for example, in an aluminum plastic film) for encapsulation, and injected with an electrolyte for formation and packaging, thus a lithium-ion battery is made.

Those skilled person in the art will appreciate that the above described methods for preparing the lithium-ion battery are merely examples. Other methods commonly used in the art may be employed without departing from the disclosure of the present application.

The positive electrode of the present application may be used in a lithium-ion battery of different structures. In the examples, a wound lithium-ion battery is taken as an example, but the positive electrode of the present application may be applied to lithium-ion batteries of a laminated structure, a multi-tab structure or the like, all of which are contained within the scope of this application.

The positive electrode of the present application may be used in a lithium-ion battery of different types. In the examples, a soft pack lithium-ion battery is taken as an example, but the positive electrode of the present application may be applied to other lithium-ion batteries such as square aluminum shell battery, cylindrical aluminum shell battery, all of which are contained within the scope of this application.

Some specific examples and comparative examples are listed below to better illustrate the application.

Example 1

The positive electrode and negative electrode are prepared firstly. For the positive electrode, the mixed underlying slurry (corresponding to the first active material layer) is uniformly coated on the Al foil, wherein the underlying slurry is stirred according to the proportion that lithium nickel cobalt manganese oxide:conductive carbon black (SP):polyvinylidene fluoride (PVDF) is 95.5:3:1.5, and the solvent is N-methylpyrrolidone (NMP). After drying in an oven at 85° C., the top slurry (corresponding to the second active material layer) is coated in the same manner, and the top slurry is stirred according to the proportion that lithium cobalt oxide (LCO):conductive carbon black (SP):polyvinylidene fluoride. (PVDF) is 97:1.4:1.6, and the solvent is N-methylpyrrolidone. Then drying is performed at 85° C., followed by pressing, cutting, slitting, and drying under a vacuum condition of 85° C. for 4 h to prepare a positive electrode. Among them, N element in the compound represented by chemical formula 1 is Al, and the content of Al is 10 ppm based on the total weight of the compound represented by chemical formula 1.

For the negative electrode, a layer of graphite slurry is uniformly coated on the surface of the copper foil, and the slurry comprises a combination of 97.7 wt. % artificial graphite, 1.3 wt. % carboxymethyl cellulose (CMC), and 1.0 wt. % styrene butadiene rubber (SBR). Drying is performed at 85° C., followed by pressing, cutting, slitting, and drying under a vacuum condition of 85° C. for 4 h to prepare a negative electrode. The prepared positive electrode and negative electrode and the separator are wound according to the sequence of positive electrode/separator/negative electrode to obtain a cell, and then the cell is sealed, injected with electrolyte, formed and capacitied, to finally obtain the finished product lithium-ion battery.

Example 2

The preparation method is the same as that of Example 1, except that the content of Al in the lithium nickel cobalt manganese oxide in Example 2 is 200 ppm.

Example 3

The preparation method is the same as that of Example 1, except that the content of Al in the lithium nickel cobalt manganese oxide in Example 3 is 1000 ppm.

Example 4

The preparation method is the same as that of Example 1, except that the content of Al in the lithium nickel cobalt manganese oxide in Example 4 is 1500 ppm.

Example 5

The preparation method is the same as that of Example 1, except that the content of Al in the lithium nickel cobalt manganese oxide in Example 5 is 2000 ppm.

Example 6

The preparation method is the same as that of Example 1, except that the N element in the lithium nickel cobalt manganese oxide in Example 6 is Mg, and the content of Mg in the lithium nickel cobalt manganese oxide is 1000 ppm.

Example 7

The preparation method is the same as that of Example 1, except that the N element in the lithium nickel cobalt manganese oxide in Example 7 is Ti, and the content of Ti in the lithium nickel cobalt manganese oxide is 1000 ppm.

Example 8

The preparation method is the same as that of Example 1, except that the N element in the lithium nickel cobalt manganese oxide in Example 8 is Zr, and the content of Zr in the lithium nickel cobalt manganese oxide is 1000 ppm.

Example 9

The preparation method is the same as that of Example 1, except that the N element in the lithium nickel cobalt manganese oxide in Example 9 is Ca, and the content of Ca in the lithium nickel cobalt manganese oxide is 1000 ppm.

Example 10

The preparation method is the same as that of Example 1, except that the N element in the lithium nickel cobalt manganese oxide in Example 10 is Fe, and the content of Fe in the lithium nickel cobalt manganese oxide is 1000 ppm.

Example 11

The preparation method is the same as that of Example 1, except that the N elements in the lithium nickel cobalt manganese oxide in Example 11 are Al and Mg, and the content of Al in the lithium nickel cobalt manganese oxide is 200 ppm and the content of Mg in the lithium nickel cobalt manganese oxide is 200 ppm.

Example 12

The preparation method is the same as that of Example 1, except that the N elements in the lithium nickel cobalt manganese oxide in Example 12 are Al, Mg and Ti, and the contents of Al, Mg and Ti in the lithium nickel cobalt manganese oxide are 200 ppm, 200 ppm and 200 ppm respectively.

Example 13

The preparation method is the same as that of Example 1, except that the N elements in the lithium nickel cobalt manganese oxide in Example 13 are Al, Mg, Ti and Zr, and the contents of Al, Mg, Ti and Zr in the lithium nickel cobalt manganese oxide are 200 ppm, 200 ppm, 200 ppm and 200 ppm respectively.

Example 14

The preparation method is the same as that of Example 1, except that the N elements in the lithium nickel cobalt manganese oxide in Example 14 are Al, Mg, Ti, Zr and Ca, and the contents of Al, Mg, Ti, Zr and Ca in the lithium nickel cobalt manganese oxide are 200 ppm, 200 ppm, 200 ppm, 200 ppm and 200 ppm respectively.

Example 15

The preparation method is the same as that of Example 1, except that the N elements in the lithium nickel cobalt manganese oxide in Example 15 are Al, Mg, Ti, Zr and Ca, and the content of Al in the lithium nickel cobalt manganese oxide is 1000 ppm, the content of Mg is 1000 ppm, the content of Ti is 200 ppm, the content of Zr is 200 ppm and the content of Ca is 200 ppm.

Example 16

The preparation method is the same as that of Example 1, except that the N elements in the lithium nickel cobalt manganese oxide in Example 16 are Al, Mg, Ti, Zr and Ca, and the content of Al in the lithium nickel cobalt manganese oxide is 1500 ppm, the content of Mg is 1000 ppm, the content of Ti is 200 ppm, the content of Zr is 1000 ppm and the content of Ca is 1000 ppm.

Comparative Example 1

The preparation method is the same as that of Example 1, except that the lithium nickel cobalt manganese oxide in Comparative Example 1 does not comprise N elements.

Thereafter, the products obtained in Examples and Comparative examples are subjected to DSC test and Nail test.

Differential scanning calorimetry (DSC) test method: in a nitrogen atmosphere, the positive electrode is placed in a crucible, and the test sample and the reference sample (an empty crucible) are respectively heated to detect the power difference between the test sample and the reference sample; test conditions: temperature range 35-450° C., heating rate 10° C./min, electrolytes are added for the electrode during testing, Test Instrument Model: NETZSCH STA449F3.

Nail test method: lithium-ion battery is placed in a 25° C. incubator and allowed to stand for 30 minutes to keep the lithium-ion battery at a constant temperature. The lithium-ion battery with constant temperature is charged to a voltage of 4.4V at a constant current of 0.5C, and then charged to a current of 0.025C at a constant voltage of 4.4V. The fully-charged lithium-ion battery is transferred to the nail tester while keeping the test environment temperature at 25° C.±2° C., and then a steel nail with a diameter of 4 mm is applied to pass through the center of the lithium-ion battery at a constant speed of 30 mm/s and reserved for 300 s. If the lithium-ion battery does not ignite, explode, smoke, it is defined as "Pass". 10 pieces of lithium-ion batteries are tested in each group. The number of lithium-ion batteries passing Nail test is used as an indicator for evaluating the safety performance of lithium-ion battery.

The parameters and test results of the respective Examples and Comparative examples are shown in Table 1 below.

TABLE 1

| Examples | active material of the first active material layer | Al (ppm) | Mg (ppm) | Ti (ppm) | Zr (ppm) | Ca (ppm) | Fe (ppm) | DSC peak/° C. of the positive electrode | DSC heat release/J/g | Nail test pass rate |
|---|---|---|---|---|---|---|---|---|---|---|
| 1 | lithium nickel cobalt manganese oxide | 10 | 0 | 0 | 0 | 0 | 0 | 302.3 | −1245 | 2/10 |
| 2 | lithium nickel cobalt manganese oxide | 200 | 0 | 0 | 0 | 0 | 0 | 303.6 | −1233 | 5/10 |
| 3 | lithium nickel cobalt manganese oxide | 1000 | 0 | 0 | 0 | 0 | 0 | 304.5 | −1230 | 7/10 |
| 4 | lithium nickel cobalt manganese oxide | 1500 | 0 | 0 | 0 | 0 | 0 | 307.3 | −1225 | 9/10 |
| 5 | lithium nickel cobalt manganese oxide | 2000 | 0 | 0 | 0 | 0 | 0 | 307.9 | −1222 | 10/10 |
| 3 | lithium nickel cobalt manganese oxide | 1000 | 0 | 0 | 0 | 0 | 0 | 304.5 | −1230 | 7/10 |

TABLE 1-continued

| Examples | active material of the first active material layer | Al (ppm) | Mg (ppm) | Ti (ppm) | Zr (ppm) | Ca (ppm) | Fe (ppm) | DSC peak/° C. of the positive electrode | DSC heat release/J/g | Nail test pass rate |
|---|---|---|---|---|---|---|---|---|---|---|
| 6 | lithium nickel cobalt manganese oxide | 0 | 1000 | 0 | 0 | 0 | 0 | 305.4 | −1245 | 6/10 |
| 7 | lithium nickel cobalt manganese oxide | 0 | 0 | 1000 | 0 | 0 | 0 | 304.9 | −1245 | 8/10 |
| 8 | lithium nickel cobalt manganese oxide | 0 | 0 | 0 | 1000 | 0 | 0 | 305.6 | −1245 | 7/10 |
| 9 | lithium nickel cobalt manganese oxide | 0 | 0 | 0 | 0 | 1000 | 0 | 305.7 | −1245 | 5/10 |
| 10 | lithium nickel cobalt manganese oxide | 0 | 0 | 0 | 0 | 0 | 1000 | 305.4 | −1245 | 6/10 |
| 2 | lithium nickel cobalt manganese oxide | 200 | 0 | 0 | 0 | 0 | 0 | 303.6 | −1233 | 5/10 |
| 11 | lithium nickel cobalt manganese oxide | 200 | 200 | 0 | 0 | 0 | 0 | 305.3 | −1225 | 7/10 |
| 12 | lithium nickel cobalt manganese oxide | 200 | 200 | 200 | 0 | 0 | 0 | 307.3 | −1225 | 8/10 |
| 13 | lithium nickel cobalt manganese oxide | 200 | 200 | 200 | 200 | 0 | 0 | 315.3 | −1225 | 8/10 |
| 14 | lithium nickel cobalt manganese oxide | 200 | 200 | 200 | 200 | 200 | 0 | 317.3 | −1225 | 8/10 |
| 14 | lithium nickel cobalt manganese oxide | 200 | 200 | 200 | 200 | 200 | 0 | 317.3 | −1225 | 8/10 |
| 15 | lithium nickel cobalt manganese oxide | 1000 | 1000 | 200 | 200 | 200 | 0 | 319.4 | −1245 | 10/10 |
| 16 | lithium nickel cobalt manganese oxide | 1500 | 1000 | 200 | 1000 | 1000 | 0 | 320.5 | −1230 | 10/10 |
| 1 | lithium nickel cobalt manganese oxide | 0 | 0 | 0 | 0 | 0 | 0 | 297.0 | −1250 | 0/10 |

By comparing Comparative Example 1 with Examples 1-16, it shows that the DSC peak temperature of the positive electrode is increased and the DSC heat release is decreased by using lithium nickel cobalt manganese oxide comprising one or more selected from a group consisting of Al, Mg, Ti, Zr, Ca, and Fe, indicating that the thermal stability of the lithium-ion battery is improved. In addition, the pass rate of the lithium-ion battery is increased at different extent, which is due to the thermal runaway of the lithium-ion battery in the event of a short circuit is reduced, which further verifying the improvement for the thermal stability of the lithium-ion battery in the event of an internal short circuit.

By comparing Examples 1-5, it shows that the thermal stability of the positive electrode is enhanced by using lithium nickel cobalt manganese oxide containing Al, and the DSC peak of the positive electrode is gradually increased and the DSC heat release is gradually decreased as the content of Al element is increased while the pass rate for Nail test of the lithium-ion battery is gradually increased. This is because Al element lowers the activity of the surface of the lithium nickel cobalt manganese oxide and improves its stability, thereby improving the thermal stability of the lithium-ion battery.

By comparing Examples 3 and 6-10, it shows that the thermal stability of the lithium-ion battery may be increased and the pass rate of Nail test may be increased by using lithium nickel cobalt manganese oxide containing different element types. This is because Mg has an ability to stabilize the surface structure, Ti can suppress the structural change of lithium nickel manganese oxide during delithiation, and Zr, Ca and Fe may also stabilize the surface structure. In addition, although the difference in the types of elements contained in lithium nickel cobalt manganese oxide leads to somewhat different pass rates of the lithium-ion battery, the influence on the DSC peak and the DSC heat release of the positive electrode is not changed significantly.

By comparing Examples 2 and 11-14, it shows that as the types of N elements contained in lithium nickel cobalt manganese oxide increase, the DSC peak of the positive electrode tends to increase, and the pass rate for Nail test of the lithium-ion battery also has the tendency to increase.

By comparing Examples 14-16, it shows that in the case of the types of the N elements contained in the lithium nickel cobalt manganese oxide being the same, when the content of the individual element is increased, the DSC peak of the positive electrode is also increased, and the pass rate for Nail test of the lithium-ion battery is also increased.

Example 17

The positive electrode and negative electrode are prepared firstly. For the positive electrode, the mixed underlying slurry (corresponding to the first active material layer) is uniformly coated on the Al foil, wherein the underlying slurry is stirred according to the proportion that lithium nickel cobalt manganate:conductive carbon black (SP):polyvinylidene fluoride (PVDF) is 95.5:3:1.5, and the solvent used is N-methylpyrrolidone (NMP). After drying in an oven at 85° C., the top slurry (corresponding to the second active material layer) is coated in the same manner, and the top slurry is stirred according to the proportion that lithium cobalt oxide (LCO):conductive carbon black (SP):polyvinylidene fluoride. (PVDF) is 97:1.4:1.6, and the solvent used is N-methylpyrrolidone. Then drying is performed at 85° C., followed by pressing, cutting, slitting, and drying under a vacuum condition of 85° C. for 4 h to prepare a positive electrode. Among them, the lithium iron phosphate is $Li_yM2_eFe_{1-e}PO_{4-f}$, 0.9≤y≤1.1, 0<e≤0.01, −0.1≤f≤0.1, M2 element in lithium iron phosphate is Al, and the content of Al is 20 ppm based on the total weight of lithium iron phosphate.

For the negative electrode, a layer of graphite slurry is uniformly coated on the surface of the copper foil, and the slurry comprises a combination of 97.7 wt. % artificial graphite, 1.3 wt. % carboxymethyl cellulose (CMC), and 1.0 wt. % styrene butadiene rubber (SBR). Drying is performed at 85° C., followed by cold pressing, cutting, slitting, and drying under a vacuum condition of 85° C. for 4 h to prepare a negative electrode. The prepared positive electrode and negative electrode and the separator are wound according to the sequence of positive electrode/separator/negative electrode to obtain a cell, and then the cell is sealed, injected with electrolyte, formed and capacitied, to finally obtain the finished product lithium-ion battery.

Example 18

The preparation method is the same as that of Example 17, except that the content of Al in the lithium iron phosphate in Example 18 is 200 ppm.

Example 19

The preparation method is the same as that of Example 17, except that the content of Al in the lithium iron phosphate in Example 19 is 500 ppm.

Example 20

The preparation method is the same as that of Example 17, except that the content of Al in the lithium iron phosphate in Example 20 is 1000 ppm.

Example 21

The preparation method is the same as that of Example 17, except that the content of Al in the lithium iron phosphate in Example 21 is 1500 ppm.

Example 22

The preparation method is the same as that of Example 17, except that the content of Al in the lithium iron phosphate in Example 22 is 2000 ppm.

Example 23

The preparation method is the same as that of Example 17, except that the content of Al in the lithium iron phosphate in Example 23 is 3000 ppm.

Example 24

The preparation method is the same as that of Example 17, except that the M2 element in the lithium iron phosphate in Example 24 is Mg, and the content of Mg is 500 ppm.

Example 25

The preparation method is the same as that of Example 17, except that the M2 element in the lithium iron phosphate in Example 25 is Se, and the content of Se is 500 ppm.

Example 26

The preparation method is the same as that of Example 17, except that the M2 element in the lithium iron phosphate in Example 26 is Zr, and the content of Zr is 500 ppm.

Example 27

The preparation method is the same as that of Example 17, except that the M2 element in the lithium iron phosphate in Example 27 is Bi, and the content of Bi is 500 ppm.

Example 28

The preparation method is the same as that of Example 17, except that the M2 element in the lithium iron phosphate in Example 28 is Ti, and the content of Ti is 500 ppm.

Example 29

The preparation method is the same as that of Example 17, except that the M2 elements in the lithium iron phosphate in Example 29 are Al and Mg, the content of Al is 500 ppm and the content of Mg is 500 ppm.

Example 30

The preparation method is the same as that of Example 17, except that the M2 elements in the lithium iron phosphate in Example 30 are Al, Mg and Se, the content of Al is 500 ppm, the content of Mg is 500 ppm and the content of Se is 500 ppm.

Example 31

The preparation method is the same as that of Example 17, except that the M2 elements in the lithium iron phosphate in Example 31 are Al, Mg, Se and Zr, the content of Al is 500 ppm, the content of Mg is 500 ppm, the content of Se is 500 ppm and the content of Zr is 500 ppm.

Example 32

The preparation method is the same as that of Example 17, except that the M2 elements in the lithium iron phosphate in Example 32 are Al, Mg, Se, Zr and Bi, the content of Al is 500 ppm, the content of Mg is 500 ppm, the content of Se is 500 ppm, the content of Zr is 500 ppm and the content of Bi is 500 ppm.

Example 33

The preparation method is the same as that of Example 17, except that the M2 elements in the lithium iron phosphate in Example 33 are Al, Mg, Se, Zr and Bi, the content of Al is 1000 ppm, the content of Mg is 1000 ppm, the content of Se is 500 ppm, the content of Zr is 200 ppm and the content of Bi is 1000 ppm.

Example 34

The preparation method is the same as that of Example 17, except that the M2 elements in the lithium iron phosphate in Example 34 are Al, Mg, Se, Zr and Bi, the content of Al is 1000 ppm, the content of Mg is 1500 ppm, the content of Se is 200 ppm, the content of Zr is 500 ppm and the content of Bi is 500 ppm.

Example 35

The preparation method is the same as that of Example 17, except that the lithium iron phosphate in Example 35 is carbon-coated lithium iron phosphate, the M2 element in the lithium iron phosphate is Al, and the content of Al is 500 ppm.

Example 36

The preparation method is the same as that of Example 17, except that the lithium iron phosphate in Example 36 is carbon-coated lithium iron phosphate, the M2 elements in the lithium iron phosphate are Al, Mg and Ti, and the content of Al is 500 ppm, the content of Mg is 500 ppm and the content of Ti is 1000 ppm.

Comparative Example 2

The preparation method is the same as that of Example 17, except that the lithium iron phosphate in Comparative Example 2 does not contain M2 elements.

Thereafter, the products obtained in Examples and Comparative examples are subjected to DSC test and Nail test.

Differential scanning calorimetry (DSC) test method: in a nitrogen atmosphere, the positive electrode is placed in a crucible, and the test sample and the reference sample (an empty crucible) are respectively heated to detect the power difference between the test sample and the reference sample; test conditions: temperature range 35-450° C., heating rate 10° C./min, electrolytes are added for the electrode during testing, Test Instrument Model: NETZSCH STA449F3.

Nail test method: lithium-ion battery is placed in a 25° C. incubator and allowed to stand for 30 minutes to keep the lithium-ion battery at a constant temperature. The lithium-ion battery with constant temperature is charged to a voltage of 4.4 V at a constant current of 0.5 C, and then charged to a current of 0.025 C at a constant voltage of 4.4 V. The fully-charged lithium-ion battery is transferred to the nail tester while keeping the test environment temperature at 25° C.±2° C., and then a steel nail with a diameter of 4 mm is applied to pass through the center of the lithium-ion battery at a constant speed of 30 mm/s and reserved for 300 s. If the lithium-ion battery does not ignite, explode, it is defined as "Pass". 10 pieces of lithium-ion batteries are tested each time. The number of lithium-ion batteries passing Nail test is used as an indicator for evaluating the safety performance of lithium-ion battery.

The parameters and measurement results of the respective examples and comparative examples are shown in Table 2 below.

TABLE 2

| Examples | active material of the first active material layer | Al (ppm) | Mg (ppm) | Fe (ppm) | Zr (ppm) | Bi (ppm) | Ti (ppm) | DSC peak/°C. of positive electrode | DSC heat release/J/g | Nail test pass rate |
|---|---|---|---|---|---|---|---|---|---|---|
| 17 | lithium iron phosphate | 20 | 0 | 0 | 0 | 0 | 0 | 301.1 | −1249 | 1/10 |
| 18 | lithium iron phosphate | 200 | 0 | 0 | 0 | 0 | 0 | 301.9 | −1248 | 3/10 |
| 19 | lithium iron phosphate | 500 | 0 | 0 | 0 | 0 | 0 | 302.3 | −1245 | 6/10 |
| 20 | lithium iron phosphate | 1000 | 0 | 0 | 0 | 0 | 0 | 304.5 | −1230 | 9/10 |
| 21 | lithium iron phosphate | 1500 | 0 | 0 | 0 | 0 | 0 | 307.3 | −1225 | 9/10 |
| 22 | lithium iron phosphate | 2000 | 0 | 0 | 0 | 0 | 0 | 308.8 | −1221 | 10/10 |
| 23 | lithium iron phosphate | 3000 | 0 | 0 | 0 | 0 | 0 | 310.7 | −1220 | 10/10 |
| 19 | lithium iron phosphate | 500 | 0 | 0 | 0 | 0 | 0 | 302.3 | −1245 | 6/10 |
| 24 | lithium iron phosphate | 0 | 500 | 0 | 0 | 0 | 0 | 303.6 | −1223 | 5/10 |
| 25 | lithium iron phosphate | 0 | 0 | 500 | 0 | 0 | 0 | 301.8 | −1221 | 6/10 |
| 26 | lithium iron phosphate | 0 | 0 | 0 | 500 | 0 | 0 | 302.4 | −1220 | 8/10 |
| 27 | lithium iron phosphate | 0 | 0 | 0 | 0 | 500 | 0 | 303.6 | −1224 | 6/10 |
| 28 | lithium iron phosphate | 0 | 0 | 0 | 0 | 0 | 500 | 303.3 | −1222 | 7/10 |
| 19 | lithium iron phosphate | 500 | 0 | 0 | 0 | 0 | 0 | 302.3 | −1245 | 6/10 |
| 29 | lithium iron phosphate | 500 | 500 | 0 | 0 | 0 | 0 | 305.3 | −1227 | 9/10 |
| 30 | lithium iron phosphate | 500 | 500 | 500 | 0 | 0 | 0 | 307.3 | −1223 | 9/10 |
| 31 | lithium iron phosphate | 500 | 500 | 500 | 500 | 0 | 0 | 315.3 | −1225 | 10/10 |

TABLE 2-continued

| Examples | active material of the first active material layer | Al (ppm) | Mg (ppm) | Fe (ppm) | Zr (ppm) | Bi (ppm) | Ti (ppm) | DSC peak/°C. of positive electrode | DSC heat release/J/g | Nail test pass rate |
|---|---|---|---|---|---|---|---|---|---|---|
| 32 | lithium iron phosphate | 500 | 500 | 500 | 500 | 500 | 0 | 317.3 | −1221 | 10/10 |
| 32 | lithium iron phosphate | 500 | 500 | 500 | 500 | 500 | 0 | 317.3 | −1221 | 10/10 |
| 33 | lithium iron phosphate | 1000 | 1000 | 500 | 200 | 1000 | 0 | 319.4 | −1226 | 10/10 |
| 34 | lithium iron phosphate | 1000 | 1500 | 200 | 500 | 500 | 0 | 320.5 | −1220 | 10/10 |
| 35 | carbon coated lithium iron phosphate | 500 | 0 | 0 | 0 | 0 | 0 | 315.8 | −1227 | 8/10 |
| 36 | carbon coated lithium iron phosphate | 500 | 500 | 0 | 0 | 0 | 1000 | 319.9 | −1225 | 10/10 |
| 2 | lithium iron phosphate | 0 | 0 | 0 | 0 | 0 | 0 | 300.0 | −1250 | 0/10 |

By comparing Comparative Example 2 with Examples 17-36, it shows that the DSC peak temperature of the positive electrode is increased and the DSC heat release is decreased by using lithium iron phosphate as the positive active material of the first active material layer, indicating that the thermal stability of the lithium-ion battery is improved. In addition, the pass rate of the lithium-ion battery is increased at different extent, which is due to the thermal runaway of the lithium-ion battery in the event of a short circuit is reduced, which further verifying the improvement for the thermal stability of the lithium-ion battery in the event of an internal short circuit.

By comparing Examples 17-23, it shows that the thermal stability of the positive electrode is enhanced by using lithium iron phosphate containing Al, and the DSC peak of the positive electrode is gradually increased and the DSC heat release is gradually decreased as the content of Al element is increased while the pass rate for Nail test of the lithium-ion battery is gradually increased. This is because Al element lowers the activity of the surface of the lithium iron phosphate and improves its stability, thereby improving the thermal stability of the lithium-ion battery.

By comparing Examples 19 and 24-28, it shows that the thermal stability of the lithium-ion battery may be increased and the pass rate of Nail test may be increased by using lithium iron phosphate containing different element types. This is because Ti can suppress the structural change of lithium iron phosphate during delithiation, and Al, Mg, Se, Zr, Bi and Ti may stabilize the surface structure. In addition, although the difference in the types of elements contained in lithium iron phosphate leads to somewhat different pass rates of the lithium-ion battery, the influence on the DSC peak and the DSC heat release of the positive electrode is not changed significantly.

By comparing Examples 19 and 29-32, it shows that as the types of M2 elements contained in lithium iron phosphate increase, the DSC peak of the positive electrode tends to increase, and the pass rate for Nail test of the lithium-ion battery also has the tendency to increase.

By comparing Examples 32-34, it shows that in the case of the types of M2 elements contained in the lithium iron phosphate being the same, when the content of the individual element is increased or decreased, the DSC peak of the positive electrode and the pass rate for Nail test of the lithium-ion battery are all influenced to some extent.

By comparing Examples 19 and 35, it shows that under the same conditions, the carbon-coated lithium iron phosphate has a more obvious improvement effect on the DSC peak of the positive electrode and the pass rate of Nail test for the lithium-ion battery By comparing Examples 35 and 36, it shows that in the case of the same carbon-coated lithium iron phosphate, when the type and content of M2 elements are increased, the DSC peak of the positive electrode and the improvement of the pass rate of Nail test for the lithium-ion battery are enhanced.

Figure 2:
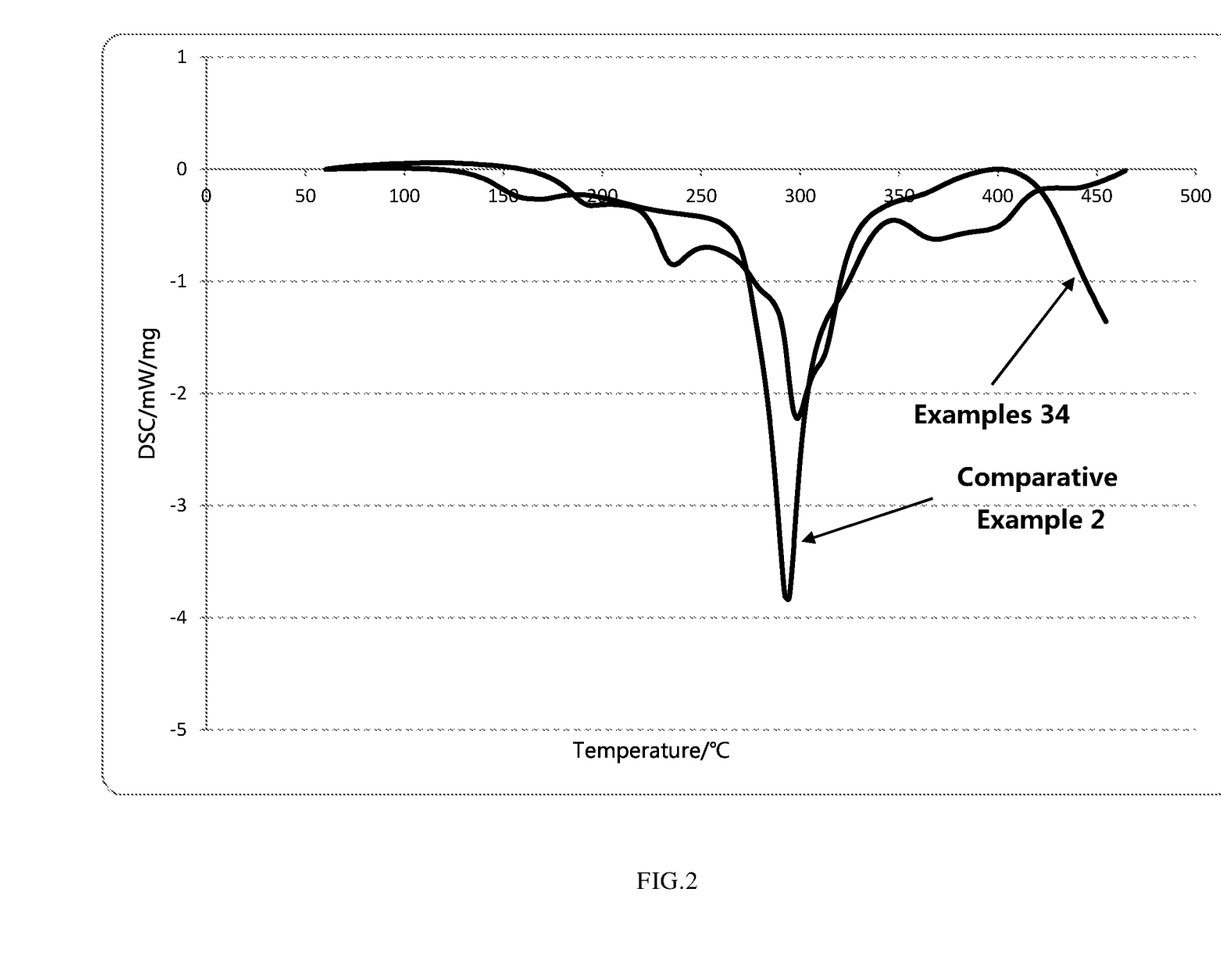
FIG. 2 shows a comparison of DSC between lithium iron phosphate containing no M2 element of the present application and lithium iron phosphate in Example 34.

FIG. 2 shows a comparison of DSC between lithium iron phosphate containing no M2 element of the present application and lithium iron phosphate in Example 34. It can be seen that with lithium iron phosphate containing M2 element, the peak value of exothermic decreases and the peak area decreases, that is, the thermal stability of the lithium-ion battery may be significantly improved.

Those skilled person in the art will appreciate that the above-described examples are merely exemplary examples and are not to be construed as limiting the present application, and various changes, substitutions and changes may be made without departing from the spirit and scope of the present application.

What is claimed is:

1. A positive electrode, comprising:
   a current collector;
   a first active material layer comprising a first active material; and
   a second active material layer,
   wherein the first active material layer is coated on at least one surface of the current collector and the second active material layer is coated on the first active material layer so that the first active material layer is arranged between the current collector and the second active material layer, and the first active material consists of compounds represented by Chemical Formula 2:

Chemical Formula 2, wherein M2 represents bismuth, and the values of y, e and f are respectively in the following ranges: $0.9 \leq y \leq 1.1$, $0 < e \leq 0.01$, $-0.1 \leq f \leq 0.1$, wherein a differential scanning calorimetry (DSC) of a two-layered structure of the first active material layer and the second active material layer has a temperature corresponding to an exothermic peak beyond 301° C.;

wherein the second active material layer comprises a second active material, and the second active material is selected from the group consisting of lithium cobalt oxide, transition metal element doped lithium cobalt oxide, metal oxide coated lithium cobalt oxide, and combinations thereof; and wherein the content of M2 is in a range of 10 ppm to 3000 ppm, based on a total weight of the compound represented by the chemical formula 2.

2. The positive electrode according to claim 1, wherein the first active material layer is coated on at least an upper surface and a lower surface of the current collector.

3. The positive electrode according to claim 1, wherein the compound represented by the chemical formula 2 is a carbon-coated compound.

4. The positive electrode according to claim 1, wherein a differential scanning calorimetry (DSC) heat release of a two-layered structure of the first active material layer and the second active material layer is less than 1250 J/g.

5. A lithium-ion battery, comprising a positive electrode, wherein the positive electrode comprising:
a current collector;
a first active material layer with a first active material; and
a second active material layer;
wherein the first active material layer is coated on at least one surface of the current collector and the second active material layer is coated on the first active material layer so that the first active material layer is arranged between the current collector and the second active material layer, and the first active material consists of compounds represented by Chemical Formula 2:

Chemical Formula 2, wherein M2 represents bismuth, and the values of y, e and f are respectively in the following ranges: $0.9 \leq y \leq 1.1$, $0 < e \leq 0.01$, $-0.1 \leq f \leq 0.1$, wherein a differential scanning calorimetry (DSC) of a two-layered structure of the first active material layer and the second active material layer has a temperature corresponding to an exothermic peak beyond 301° C.;

wherein the second active material layer comprises a second active material, and the second active material is selected from the group consisting of lithium cobalt oxide, transition metal element doped lithium cobalt oxide, metal oxide coated lithium cobalt oxide, and combinations thereof; and wherein the content of M2 is in a range of 10 ppm to 3000 ppm, based on a total weight of the compound represented by the chemical formula 2.

6. The lithium-ion battery according to claim 5, wherein the first active material layer is coated on at least an upper surface and a lower surface of the current collector.

7. The lithium-ion battery according to claim 5, wherein the compound represented by the chemical formula 2 is a carbon-coated compound.

8. The lithium-ion battery according to claim 5, wherein a differential scanning calorimetry (DSC) heat release of a two-layered structure of the first active material layer and the second active material layer is less than 1250 J/g.

* * * * *